UNITED STATES PATENT OFFICE.

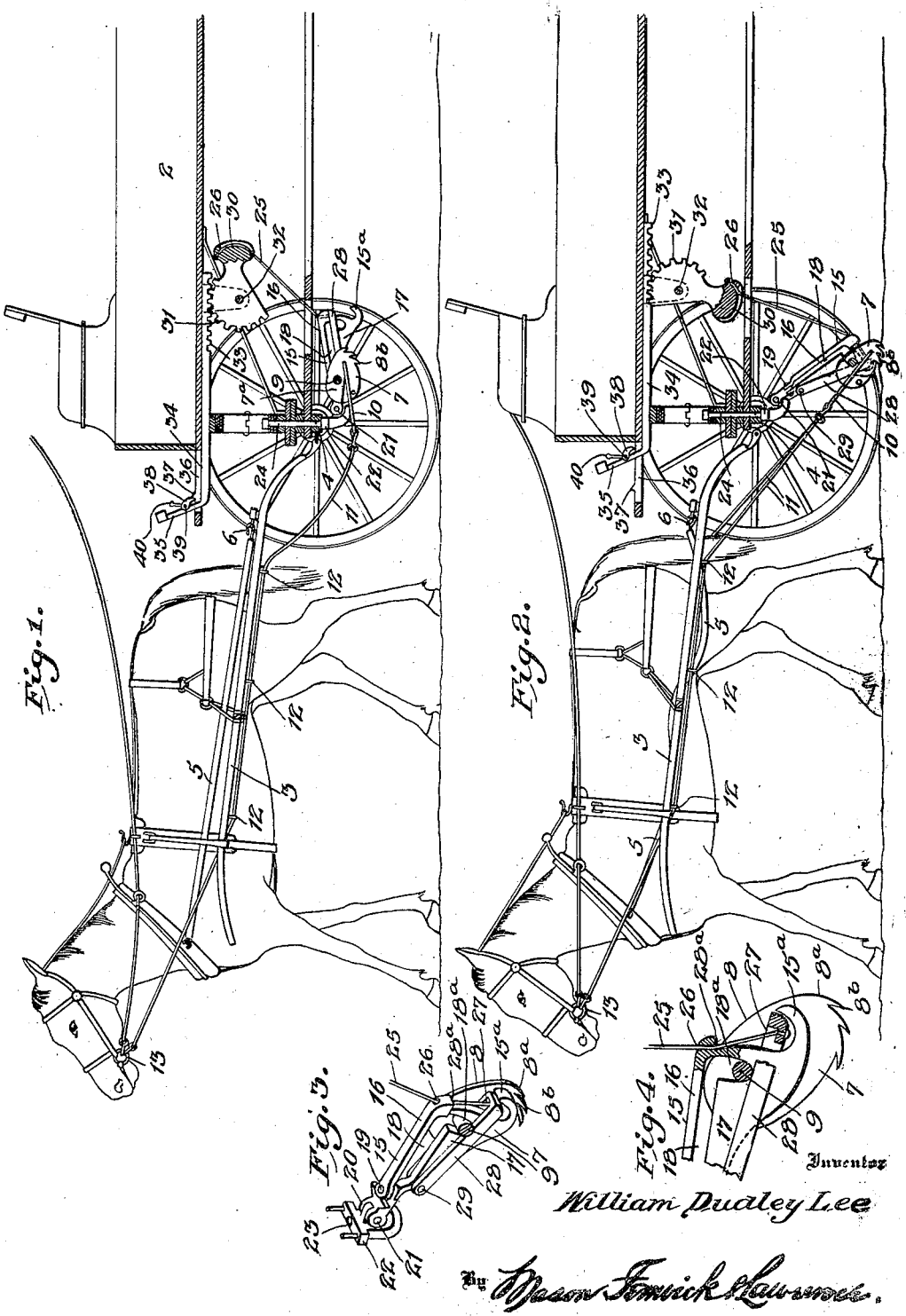

WILLIAM DUDLEY LEE, OF OAKLAND, CALIFORNIA.

HORSE-HITCH FOR VEHICLES.

1,263,330.      Specification of Letters Patent.    Patented Apr. 16, 1918.

Application filed July 27, 1917. Serial No. 183,140.

*To all whom it may concern:*

Be it known that I, WILLIAM DUDLEY LEE, a citizen of the United States, residing at Oakland, in the county of Alameda and State of California, have invented certain new and useful Improvements in Horse-Hitches for Vehicles; and I do hereby declare the following to be a full, clear, and exact description of the invention, such as will enable others skilled in the art to which it appertains to make and use the same.

This invention relates to hitches and more particularly to a type of hitch adapted to be readily connected to and carried by a vehicle.

It is one of the objects of the present invention to provide a hitch of such construction, organization and arrangement that a portion of it may be lowered into frictional contact with the ground or roadway surface and to which part there is adapted to be connected a hitch rein so that when the hitching device is lowered in operative position, a forward or turning movement of the draft animal with relation to the vehicle will cause the firm frictional engagement of the friction part with the roadway, and there will be established a toggle reaction between the ground and the vehicle so that the forward movement of the draft animal is resisted not only by the frictional engagement of the contact member with the surface of the roadway but is further resisted by the entire superposed load of the front portion of the vehicle to which the hitch is connected. It is a further object of the present invention to provide a hitch structure carried by a vehicle which is capable of providing for the normal free movement of the head of the animal when the hitch is in an inoperative position and yet which device will operate instantly as soon as the hitch is lowered so that its contact member engages the surface so that slack in the hitch rein will be instantly taken up and the animal is caused to move back in the shafts and the traces slacked up. Another object of the invention is to provide means for quickly and readily lowering the hitch device into operative position and also for locking it in inoperative position. A further object of the invention is to provide a hitch of such construction that it may be readily attached to the fore structure of a vehicle and which when it is lowered in position to prevent forward movement of the animal, will not allow him to swing his head to right or left without encountering the holding back effect of the hitching device.

With these and other objects in view as will be made manifest in the following specification and which will be obvious to those skilled in the art, the present invention consists of a novel hitch involving a lever pivotally connected to a vehicle structure and carrying a sliding weight or friction member capable of being lowered by the lever into contact with the surface of a roadway and further consists of means whereby the hitch device may be rendered inoperative by being elevated with relation to the vehicle or whereby it may be lowered into contact with the road surface for hitching purposes.

There is described in the following specification one embodiment of the invention this being illustrated in the accompanying drawings, but it is understood that various details in arrangement of parts and in the proportions and sizes of the same may be changed within the scope of the specification and invention and without departing from the spirit of the appended claims. It is also obvious that various changes are contemplated in the details of construction so that the device may be readily connected to and be rendered useful with various types of vehicles irrespective as to the constructional details of the latter.

In the accompanying drawings:—

Figure 1 is a side elevation in partial sectional view of a wagon with its shafts showing a horse attached thereto illustrating the improved hitch as locked in its inoperative position so that the vehicle is free to be drawn by the animal;

Fig. 2 is a similar view showing the hitch in its operative or lowered and holding back position;

Fig. 3 is a perspective view of the hitch lever and its associated joint devices one cheek of the friction weight or member being omitted; and Fig. 4 is a sectional detail of the swinging end of the lever and the throw out arm illustrating the connection of the lifting cord to the throw out arm.

In the present drawing the invention is illustrated as being provided for attachment to a wagon body 2 having the usual shafts 3 which are connected to the front axle 4 the traces 5 being connected at 6 to a swingletree and in the usual manner to the harness, or the collar. The hitching device in its illustrated form comprises a weight or ground engaging member hereinafter termed the friction member 7 which substantially comprises parallel vertically disposed cheeks 8 of suitable form preferably having each an eccentric curved edge 8ª with relation to a pivot or bar 9 connecting the cheek plates 8. The friction member 7 is provided with a tail 10 to which is connected a hitch rein 11 which may be guided forward along the shafts 3 through suitable eyes or guides 12 the forward end of the hitching rein 11 being connected to the rings 13. For the purpose of raising or lowering the friction member 7, there is provided a device in the form of a lever 15 having upper and lower arms 16, 17, between which is formed a longitudinal slot 18 in which the pivot pin or bar 9 of the hitch or friction member 7 is mounted and adapted to play back and forth longitudinally of the lever 15. This latter is provided with a vertical pivot 19 passing through a suitable link or other pivoting device 20 which in turn is provided with a horizontal pivot 21 which is shown as mounted in a block or hanger 22 adapted to be connected to any suitable portion of the vehicle structure and which is shown for instance in the present case as perforated as at 23 to receive the lower end of a king bolt 24 securing the axle 4 to the circle at the front end of the vehicle and below the front spring. However, I do not wish to be limited to the preferred form and construction of the hanger or block 22 here shown for the reason that this is capable of being designed, proportioned and shaped to fit various types of fore structures of vehicles. Also it is obvious that the link 20 carrying the pivots 19 and 21 also may be made of various lengths and proportions as may be desired for the purpose of providing for ready attachment of the device to vehicles of different sizes and therefore in which the height of the front end of the lever 15 will vary in vehicles of different types and heights.

For the purpose of raising and lowering the lever 15 to release or hitch the horse as may be desired, the lever may be connected by suitable means to the vehicle for this purpose and here is shown as comprising a flexible member in the form of a cord or chain 25 the lower end of which is shown as passing through an eye 26 in the swinging end of the lever and is connected at 27 to the adjacent end of a throw out arm 28 whose opposite end is pivoted at 29 to the lower portion 17 of the lever, the throw out arm preferably being in the form of a bifurcated or U-shaped element so as to straddle the lower portion of the lever 15.

The lifting cord 25 passes over a segment 30 forming a portion of a segmental gear 31 which is pivoted at 32 which may be mounted in suitable brackets extending from the bottom of the wagon 2. The segmental lever is shown as engaged by a rack 33 having a forwardly extending shank 34 which is provided with an upturned portion forming a trip lever 35 which is adapted to reciprocate in a slot 36 in the foot board of the vehicle. The foot board 36 may be provided with a shoulder or ratchet tooth 37 which is adapted to be engaged by a pawl 38 pivoted at 39 on the lever end of 35 so that when the latter is pushed forwardly by the driver the pawl 38 will lock the lever in its foremost position and thence through the rocking segment 30 pull the cord 25 and thus lift the lever 19 and sustain it in an elevated position.

In operation of the device, the driver unlatches the pawl 39 by pressing on a convenient foot lever 40 attached thereto, which permits the rack rod 34 and the rack 33 to move rearwardly owing to the weight of the lever 15 and also to the weighted portion 30 of the segmental gear 31. The lowering of the lever 15 thus permits the friction member 7 to run freely from its foremost position shown in Fig. 1 in the slot 18 rearwardly thereof and down toward the lower end of the lever 15 to the position shown in Fig. 2 in which position the cross pin or pivot 9 Fig. 4 will drop into a lateral extension 18ª of the slot 18 the adjacent walls of the slot 18ª acting to prevent the longitudinal movement of the pivot 9 of the friction member 7 to and fro in the lever when the latter has been lowered. Obviously, when the cord 25 is slackened by release of the foot lever 35 and the lever 15 permitted to fall to the position shown in Fig. 2, the weight of the friction member 7 and the throw out arm 28 causes this to fall along the side of the lever 15 and permits the pin 9 to freely enter the extension 18ª of the slot. As soon as tension is applied to the cord or chain 25 for the purpose of lifting the lever 15 the first action of the cord is to swing the throw out arm 28 upwardly on its pivot and thus lift the transverse pin or pivot 9 from the spiral extension 18ª into the plane of the longitudinal slot 18. When the lever 15 is in its uppermost position it will be clear that there is provided ample slack in the check rein 11 so that the horse may move his head freely without restriction by the friction member 7 which latter is provided with a weighted end 7ª which has the tendency to lift its opposite end or portion 8ª and to cause the device to slide forwardly in the slot of the lever. For the purpose of increasing the frictional resistance of the friction member its eccentric edges 8ª are provided with tangential and outwardly deflected teeth 8ᵇ which when the eccentric end of the member 7 swings about the pivot 9 firmly grip into the road surface, and with this gripping or frictional resistance with the lever 15 the former forming with the lever a toggle construction so that the harder the animal pulls forwardly on the hitch rein 11 more resistance is offered by the friction device as this is drawn forwardly and reacts against the lever 15 through which the force is transmitted in thrust-like effect upon the forward portion of the vehicle the entire weight of the latter being utilized therefore to prevent the overthrow of the eccentric edge of the hitch friction member.

Movement in a vertical plane of the lever 15 is provided for through means of the pivot 21 mounted in the hanger block 22 and this latter is shown as provided with a shoulder 22ᵃ reaching in under the link 20 to limit the downward movement of this about its pivot. Relative movement in a horizontal plane of the link 20 with respect to the lever 15 is provided by the vertical pivot 19. Therefore, when the hanger 22 is connected to the front axle of the vehicle as in this instance, then the horse may turn either to the right or left without affecting the position of the lever 15 when in elevated position with respect to the axle. The upper surface of the throw-out arm 28 is held flush with the bottom of the slot 18 in the lever by reason of abutment with the arm 28 against a shoulder 28ᵃ on a convenient portion of the lever 15 when the downward movement of the arm 28 with respect to the lever is limited by engagement with the shoulder or hooked end 15ᵃ of the lever with the adjacent end of the throw-out arm 28 as shown in Fig. 4.

What is claimed as new is:—

1. The combination with a vehicle, of a hitching device pivotally connected to the vehicle front axle and having at its opposite end a sliding and swinging friction member adapted to frictionally engage the road surface, and a hitch rein connected to the device and for attachment to the horse harness whereby when said device is lowered forward or turning motion of the draft animal is prevented and the hitch rein tightened up.

2. The combination with a vehicle, of a compression hitching lever pivotally connected at one end to the vehicle and having at its opposite end a sliding pivotal member adapted to frictionally engage the road surface, means on the vehicle for raising or lowering the member, and a hitch rein connected to the device and for attachment to the horse harness, said member operative when the lever is lowered to slide rearwardly and pull back on the rein.

3. The combination with a vehicle, of a hitching lever pivotally connected at one end to the vehicle and having its opposite end adapted to frictionally engage the road surface, means on the vehicle for raising or lowering the device, and a lever rein connected to the lever and for attachment to the horse harness, and a sliding friction means on the lever for slacking the rein when the lever is raised and for tightening the rein when it is lowered, and whereby forward or turning movement of the draft animal is prevented.

4. The combination with a vehicle, of a lever pivoted at its forward end on said vehicle, a friction hitch member slidably and pivotally mounted upon said lever, so as to move down and rearwardly when the lever is lowered, and a hitch rein connected to said member, whereby said member, when the lever is lowered, pulls back on the rein and reacts between the ground and the same to check forward or turning motion of the draft animal.

5. The combination with a vehicle, of a lever pivoted on said vehicle, a friction member pivotally and slidably mounted upon said lever, and a hitch rein connected to said member, whereby said member, when the lever is lowered, reacts between the ground and the same to check forward or turning motion of the draft animal.

6. The combination with a vehicle, of a hitching device adapted to be raised or lowered, a hitch rein, said device including rearwardly sliding means to which the latter is connected whereby as the device is lowered to hitch the animal the rein is made taut to draw the animal back in the shafts and prevents forward or turning movement.

7. The combination with a vehicle, of a hitching device adapted to be raised or lowered, a hitch rein, said device including a slotted lever with sliding means to which the latter is connected whereby as the lever is lowered to hitch the animal the rein is made taut to draw the animal back in the shafts and is adapted to engage the ground and react against the lever as a hold back.

8. In a hitching device, a lever adapted for pivotal connection at its front end to a vehicle, means for raising or lowering the lever, means for locking it in raised position, and a pivotal gripping member slidably mounted on the lever to which a hitch rein may be connected, said member sliding down as the lever is lowered and reacting against the lever to form a hold back.

9. In a hitching device, a pivotal swinging friction member to which a hitch rein may be connected, a lever on which said member is slidably mounted, said lever being pivotally connected at its front end to the front axle of a vehicle and so adapted to permit a swinging movement of said axle relative to said member or lever when in operative position, and means for lowering or lifting said lever and member.

10. In a hitching device, a friction member, a slotted lever adapted to be pivotally connected to a vehicle structure and having a longitudinal slot from side to side, the slot having a lateral extension at one end, a part connected to said member operative in said slot, means for preventing said part entering the extension when the lever is in one position and for permitting it to enter when in another position, and a structure for lifting and lowering the lever and member.

11. In a hitching device, a friction member, a slotted lever pivotally connected to the front axle of a vehicle structure and having a longitudinal slot from side to side, the slot having a lateral extension at one end, a part connected to said member operative in said slot, means for preventing said part entering the extension when the lever is in one position and for permitting it to enter when in another position, and a structure for lifting and lowering the lever and member.

12. In a hitching device, a friction member, a slotted lever adapted to be pivotally connected to a vehicle structure and having a longitudinal slot from side to side, the slot having a lateral extension at one end, a part connected to said member operative in said slot, means for preventing said part entering the extension when the lever is in one position and for permitting it to enter when in another position, and a structure for lifting and lowering the lever and member, and whereby when the lever is lifted the part on said member is lifted from the slot extension into the slot plane to play back and forth therein, when being raised and lowered.

13. In a hitching device, a friction member, a slotted lever adapted to be pivotally connected to a vehicle structure and having a longitudinal slot from side to side, the slot having a lateral extension at one end, a part connected to said member operative in said slot, means for preventing said part entering the extension when the lever is in one position and for permitting it to enter when in another position, and a structure for lifting and lowering the lever and member, and whereby when the lever is lifted the part on said member is lifted from the slot extension into the slot plane to play back and forth therein, when being raised and lowered, said lever being inclined when elevated to hold the said member forward.

In testimony whereof I affix my signature.

WILLIAM DUDLEY LEE.

Copies of this patent may be obtained for five cents each, by addressing the "Commissioner of Patents, Washington, D. C."